(12) United States Patent  (10) Patent No.: US 7,336,633 B2
Kruys  (45) Date of Patent: Feb. 26, 2008

(54) MEDIA ACCESS CONTROLLER FOR HIGH BANDWIDTH COMMUNICATION MEDIA AND METHOD OF OPERATION THEREOF

(75) Inventor: Jan P. Kruys, Harmelen (NL)

(73) Assignee: Agere Systems Inc., Allentown, PA (US)

( * ) Notice: Subject to any disclaimer, the term of this patent is extended or adjusted under 35 U.S.C. 154(b) by 1004 days.

(21) Appl. No.: 10/156,211

(22) Filed: May 28, 2002

(65) Prior Publication Data

US 2002/0181434 A1 Dec. 5, 2002

Related U.S. Application Data

(60) Provisional application No. 60/294,064, filed on May 29, 2001.

(51) Int. Cl.
*H04Q 7/00* (2006.01)
(52) U.S. Cl. .................. 370/330; 370/436; 370/445
(58) Field of Classification Search ............... None
See application file for complete search history.

(56) References Cited

U.S. PATENT DOCUMENTS 5,875,399 A * 2/1999 Kallin et al. ............... 455/434
6,031,827 A * 2/2000 Rikkinen et al. ........... 370/330
6,229,800 B1 * 5/2001 Thompson et al. ......... 370/347
6,275,990 B1 * 8/2001 Dapper et al. .............. 725/106
6,370,153 B1 * 4/2002 Eng ........................... 370/438
6,532,225 B1 * 3/2003 Chang et al. ............... 370/341
6,577,848 B1 * 6/2003 Gregg et al. ............... 455/13.2
6,813,252 B2 * 11/2004 Chang et al. ............... 370/294
6,839,333 B1 * 1/2005 .ANG.kerberg ............. 370/330
7,095,754 B2 * 8/2006 Benveniste ................. 370/465
2002/0110085 A1 * 8/2002 Ho et al. ..................... 370/230

* cited by examiner

*Primary Examiner*—Phirin Sam

(57) ABSTRACT

An access control method for a medium, a media access controller and a wireless communication system incorporating the method or the controller. In one embodiment, the method includes: (1) allowing first and second devices to employ a control channel defined in the medium to identify mutually available ones of a plurality of time and frequency dependent data communication elements defined in the medium and (2) thereafter granting the first and second devices access to the mutually available ones to enable data communication therebetween.

21 Claims, 4 Drawing Sheets

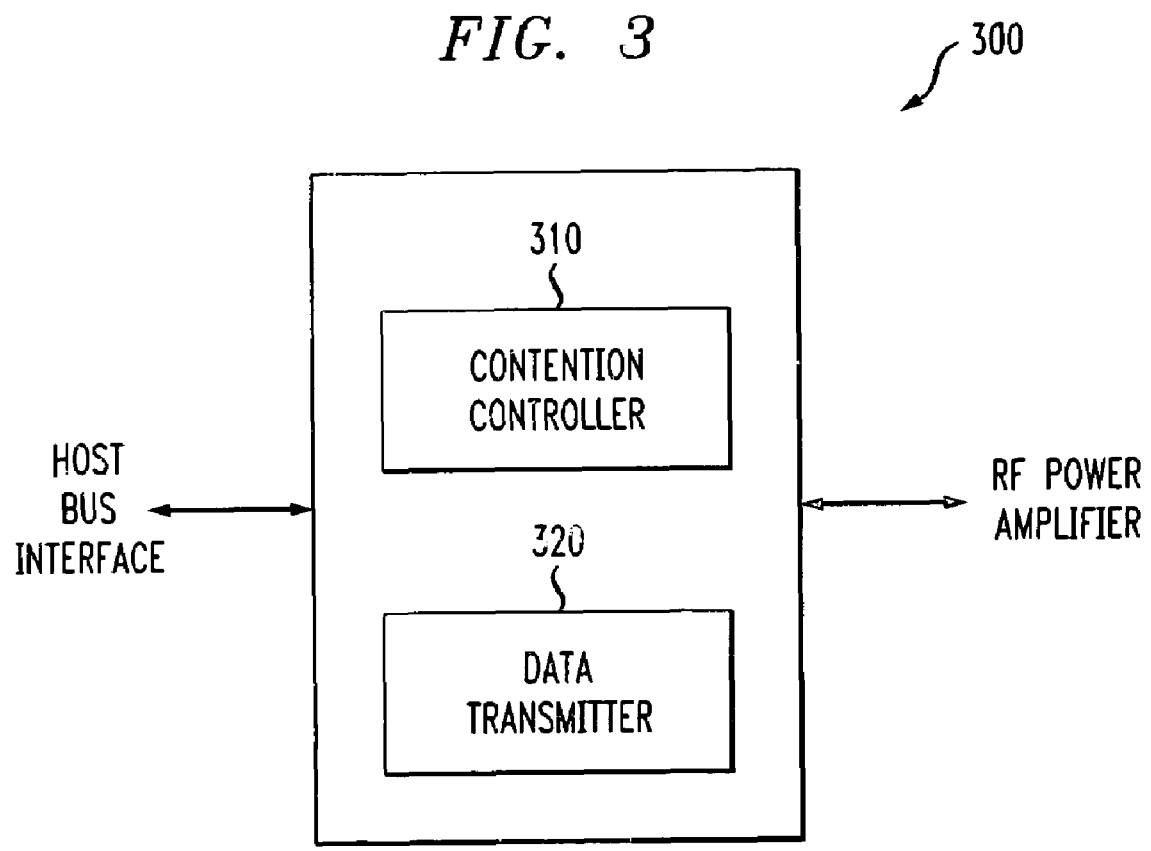

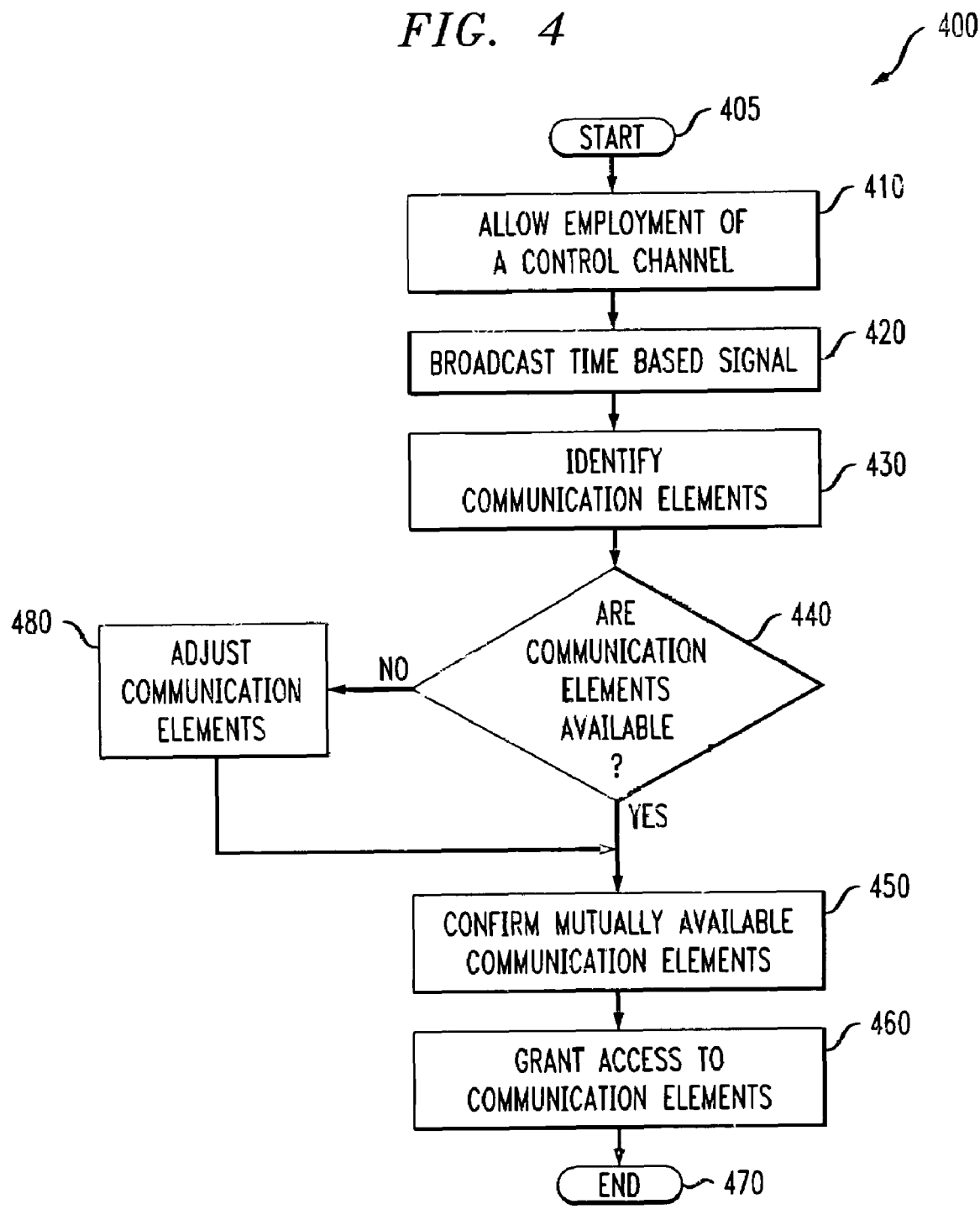

MEDIA ACCESS CONTROLLER FOR HIGH BANDWIDTH COMMUNICATION MEDIA AND METHOD OF OPERATION THEREOF

CROSS-REFERENCE TO RELATED APPLICATION

This Application claims the benefit of U.S. Provisional Application Ser. No. 60/294,064, filed on May 29, 2001, and entitled "High Speed Binary Transmission System," commonly assigned with the present invention and incorporated herein by reference.

TECHNICAL FIELD OF THE INVENTION

The present invention is directed, in general, to a wireless transfer of data and, more specifically, to a media access controller for high bandwidth and a method of operation thereof.

BACKGROUND OF THE INVENTION

Radio frequency (RF) signals have delivered audio and video programming and similar information to distant locations for decades. As the demand for a mobile information society increases, the use of RF signals for data transfer has increased. Since RF signals are wireless, RF networks do not present a mobility challenge like hard-wired networks with connections such as land-based telephone lines or cable jacks. As the wireless transfer of information continues to increase in popularity, the high-speed wireless transmission of tremendous amounts of data is becoming more essential to the everyday function of many companies.

As a result, high-speed wireless data transfer has quickly become a highly profitable field of technology, with each competitor seeking the fastest data transfer capabilities, along with the fewest possible errors in the data stream. The traditional approach to wireless data transfer has been to employ RF signals to transmit the data from a transmitter to a distant receiver. With this conventional approach, data is first converted to an analog format so that it may be transmitted using RF signals. The data is then transmitted to a receiver by modulating the analog data on an RF carrier wave, amplifying the signal, and transmitting the signal to a waiting receiver. The receiver receiving the data signal demodulates the RF signal to extract the analog data stream, and forwards the data for conversion back to a binary format so that it may be used as desired.

A media access controller (MAC) in a transmitter and receiver is responsible for implementing the correct protocol for transmitting and receiving data via a designated media. The MAC typically includes some memory to store incoming and outgoing packets (buffers) and other data (configuration, statistics). The main characteristics of a typical MAC are the packet format (size, headers), the channel access mechanisms and the network management features. The amount of on-board memory may also be important, because the MAC may need a significant number of buffers to compensate for potential interface latencies.

A typical MAC protocol is the IEEE 802.11 standard. In 802.11, the MAC may use a contention resolution scheme that listens to a RF channel to determine if it is free. If so, then data may be sent via the RF channel. If the RF channel is not free, then the MAC will determine at another time if the channel is free. The contention resolution scheme, therefore, may be time costly which may translate to a reduced data bit rate.

Accordingly, what is needed in the art is a method for accessing a media and a media access controller which avoids delay by using multiple frequencies and time slots in parallel.

SUMMARY OF THE INVENTION

To address the above-discussed deficiencies of the prior art, the present invention provides an access control method for a medium, a media access controller and a wireless communication system incorporating the method or the controller. In one embodiment, the method includes: (1) allowing first and second devices to employ a control channel defined in the medium to identify mutually available ones of a plurality of time and frequency dependent data communication elements defined in the medium and (2) thereafter granting the first and second devices access to the mutually available ones to enable data communication therebetween.

The present invention therefore introduces the broad concept of dividing a data channel into frequency- and time-dependent communication elements, such that access to elements can be selectively and flexibly granted to communicating ones of a plurality of devices to fulfill a variety of bandwidth requirements.

In one embodiment of the present invention, the medium has a bandwidth of at least 50 Mbits per second. In one embodiment to be illustrated and described, the medium is wireless and has a bandwidth of at least 100 Mbit per second. In fact, the present invention is not limited to a particular transmission speed, and enjoys particular advantage as transmission speeds increase.

In one embodiment of the present invention, the data communication is half-duplex. The data communication may, however, be as the first and second devices require.

In one embodiment of the present invention, the method further includes broadcasting a time base signal over the control channel to align the first and second devices temporally. The time base signal, while not required by the present invention, is one technique by which the devices can resynchronize and thereby discriminate in the temporal dimension.

In one embodiment of the present invention, the method further includes receiving occasional transmissions from the first and second devices regarding free and in-use data communication elements. These transmissions, while not essential to the present invention, are advantageous in the identification of mutually available data communication elements.

In one embodiment of the present invention, the data communication includes a third device, the data communication elements further being available to the third device. The present invention therefore can support multicasting in some embodiments.

In one embodiment of the present invention, the first device determines a number of data communication elements to employ for the data communication based on a desired data transmission rate. In this manner, bandwidth can be supplied based on transmission requirements. Alternatively, bandwidth can be allocated based on network loading or overall priority considerations.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 3 illustrates a block diagram of an embodiment of a media access controller constructed in accordance with the principles of the present invention; and FIG. 4 illustrates a flow diagram of an embodiment of a method of access control for a medium, constructed in accordance with the principles of the present invention.

DETAILED DESCRIPTION

Figure 1:
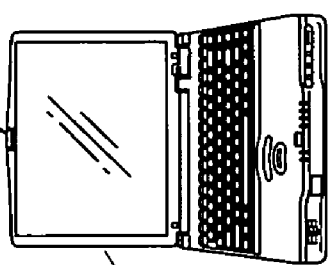
FIG. 1 illustrates a network diagram of an embodiment of a wireless communication system constructed in accordance with the principles of the present invention.
Figure 1:
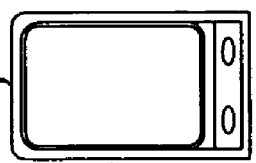
Figure 1:
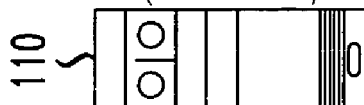
Figure 1:
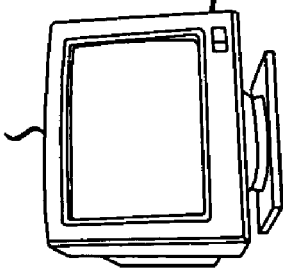

Referring initially to FIG. 1, illustrated is a network diagram of an embodiment of a wireless communication system, generally designated 100, constructed in accordance with the principles of the present invention. The wireless communication system 100 includes a first wireless device 110 with a monitor 115, a second wireless device 120, a third wireless device 130 and a wireless medium 140. The wireless medium 140 is divided into a control channel 144 a plurality of time and frequency dependent data communication elements 147 that cooperate to communicate data between and among wireless devices (including the first and second wireless devices 110, 120).

As illustrated, the wireless communication system 100 may be a conventional, ad-hoc configuration that connects a plurality of wireless devices through radio frequency to form an independent wireless Local Area Network (WLAN). In other embodiments, the wireless communication system 100 may include access points that may extend the range of the independent WLAN by acting as a repeater. Multiple access points may be used to provide wireless coverage for an entire building or campus.

In yet other embodiments, the wireless communication system 100 may include multiple access points which may link the wireless communication system 100 to a wired network and allow users to efficiently share network resources. In one embodiment, the wireless communication system 100 may employ conventional 60 GHz transmitters and receivers.

The first wireless device 110 may be a standard computer capable of receiving and transmitting data wirelessly. For example, the first wireless device 110 may be a conventional desktop computer capable of wireless data communication. The monitor 115 may be a standard monitor coupled to the first wireless device 110. One skilled in the art will understand desktop computers or other devices that may be capable of wireless data communication.

The second wireless device 120 may be a conventional laptop computer capable of wirelessly transferring data. Similarly, the third wireless device 130 may be a conventional personal digital assistant (PDA) that is also capable of wirelessly transferring data. One skilled in the art will understand that the first, second or third wireless device 110, 120, 130, may be other wireless devices capable of wireless data communication. For example, the first, second or third wireless device 110, 120, 130, may be a cellular telephone. It is fully anticipated that the wireless communication system 100 may include more wireless devices than just the first, second and third wireless devices 110, 120, 130.

The wireless medium 140 may be a radio frequency. In one embodiment, the wireless medium 140 may be a 60 GHz frequency of a WLAN. In the illustrated embodiment, the wireless medium 140 has a bandwidth of at least 50 Mbits per second. As illustrated, the wireless medium 140 may provide an interconnection between the first wireless device 110 and the second wireless device 120. Of course, the wireless medium 140 may also provide an interconnection between a plurality of wireless devices, such as the third wireless device 130, that may be present within the wireless communication system 100. In some embodiments, the wireless medium 140 may provide an interconnection back to a wired network through an access point.

The wireless medium 140 includes the control channel 144 and the plurality of time and frequency dependent data communication elements 147. The control channel 144 is not used for transmitting data. Instead, the control channel 144 is employed by the wireless devices (such as the first wireless device 110) to identify mutually available ones of the plurality of time and frequency dependent data communication elements 147.

In some embodiments, the control channel 144 may also be used to broadcast a time base signal to temporally align the first wireless device 110, the second wireless device 120 and the third wireless device 130. Since the control channel 144 is not used to transmit data, a lack of efficiency is not a high concern. The control channel 144, therefore, may employ a conventional IEEE 802.11 protocol. In addition, the control channel 144 may employ a row of the plurality of time and frequency dependent data communication elements 147 that correspond to a single radio frequency (RF) channel. The control channel 144 may also employ another multiple access protocol which may be used with a fully distributed system.

As mentioned above, the first wireless device 110 and another wireless device, such as the second wireless device 120 or the third wireless device 130, employs the control channel 144 to identify mutually available ones of said plurality of time and frequency dependent data communication elements 147. Initially, the first wireless device 110 identifies a number of the plurality of time and frequency dependent data communication elements 147 to employ for the data communication based on a desired data transmission rate. The first wireless device 110 and the second wireless device 120 interact to gain access to the mutually available ones of said plurality of time and frequency dependent data communication elements to enable data communication between them. In some embodiments, the interaction between the first wireless device 110 and the second wireless device 120 may include several cycles.

In the illustrated embodiment, a media access controller in the first wireless device 110 and in the second wireless device 120 identifies and grants access to mutually available ones of said plurality of time and frequency dependent data communication elements 147 through the control channel 144. In the illustrated embodiment, the data communication may be half-duplex. In other embodiments, the data communication may be limited to even simplex.

One skilled in the art, of course, will understand that the data communication between the first wireless device 110 and the second wireless device 120 represents data communication between other wireless devices which may be present in the wireless communication system 100. For example, the second wireless device 120 and the third wireless device 130 also transmits and receives data therebetween by employing the control channel 144 to identify mutually available ones of the plurality of time and frequency dependent data communication elements 147. Each wireless device may also be considered the transmitter or the receiver. In addition to data communication, the wireless devices of the wireless communication system 100, for instance the first wireless device 110, the second wireless device 120 and the third wireless device 130, may generate occasional transmissions regarding free and in-use wireless devices or data communication elements. In one embodiment, the transmissions regarding free and in-use data communication elements may be transmitted through the control channel 144. Additionally, a wireless device such as the first wireless device 110 may broadcast a time base signal over the control channel 144 to align the first and second wireless devices temporally.

Figure 2:
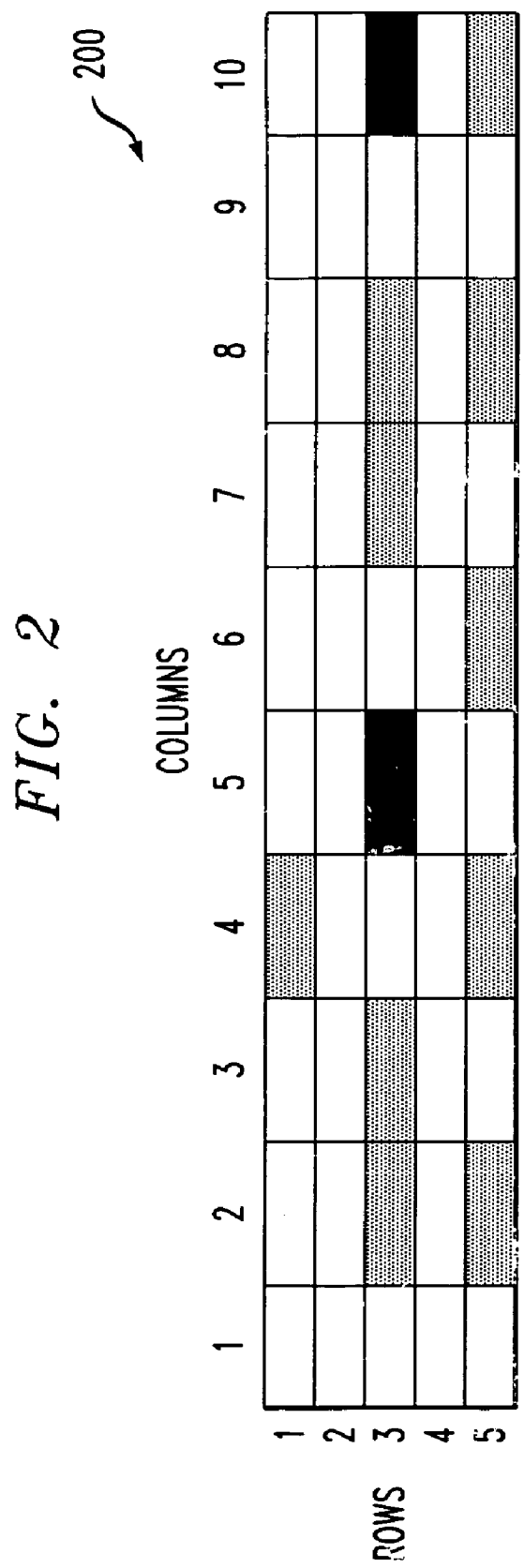
FIG. 2 illustrates a block diagram of an embodiment of a data communication element matrix constructed in accordance with the principles of the present invention.

Referring now to FIG. 2, illustrated is a block diagram of an embodiment of a data communication element matrix, generally designated 200, constructed in accordance with the principles of the present invention. The data communication element matrix 200 is an example of a plurality of time and frequency dependent communication elements within a wireless medium, such as the wireless medium 140 discussed above with respect to FIG. 1. The exemplary data communication element matrix 200 of FIG. 2 is composed of five rows and ten columns, resulting in a capacity of 50 time and frequency dependent communication elements. The capacity of the data communication element matrix 200 may be determined by a wireless device such as the first wireless device 110 discussed above with respect to FIG. 1. Each element of the data communication element matrix 200 may represent a different RF channel of a certain width and each column may represent a time period of a certain length. In FIG. 2, therefore, each row is composed of 10 elements defined by the width of the RF channel and the length of the time period.

Typically, first and second wireless devices may decide to use a series of the time and frequency dependent communication elements for data communication. Such a series may, but need not, be contiguous in either the RF channel or the time dimension even though capacity allocation becomes easier if variation is limited to a single dimension and if the time and frequency dependent communication elements are contiguous. The capacity of the wireless medium may be determined in terms of time, such as an acceptable delay time, and in terms of the available spectrum such as the number of RF channels.

In addition to defining capacity, a first wireless device may allocate the time and frequency dependent communication elements by interacting with a second wireless device. For example, the first wireless device identifies (and communicates to a second wireless device via a control channel) a time and frequency dependent communication element or a set of time and frequency dependent communication elements selected from the data communication element matrix 200. The second wireless device receives the control signal on the control channel and determines whether any or all of the identified time and frequency dependent communication elements of the data communication element matrix 200 are also available to it. If the first and second wireless devices determine that the identified time and frequency dependent communication elements are mutually available, the first device then employs the time and frequency dependent communication elements for data communication. Of course, the second wireless device may also use the mutually available time and frequency dependent communication elements to transmit data to the first wireless device.

Allocation is represented in FIG. 2 by the shaded time and frequency dependent communication elements. For example, Row 1 represents an allocation of 10% of one RF channel, since only one time and frequency dependent communication element is shaded. Similarly, Row 5 represents an allocation of 50% of one RF channel. Row 3 represents an allocation of two transmission patterns. The first transmission pattern is represented by the gray-shaded time and frequency dependent communication elements in columns 2, 3, 7 and 8. This transmission pattern repeats every five time and frequency dependent communication elements for an overall allocation of 40% of one RF channel. The second transmission pattern is represented in Row 3 by the black shaded time and frequency dependent communication elements in columns 5 and 10 for an allocation of 20% of one RF channel. Row 3 therefore represents a single RF channel being employed by two logical channels. In the illustrated embodiment, a maximum of 10 logical channels may be defined on one physical RF channel.

The allocated time and frequency dependent communication elements may be solely employed for data communication. In addition, the available time and frequency dependent communication elements may be employed as long as necessary for data communication. The data to be transmitted therefore does not have to be packetized per, for example, IEEE 802.11. The number of time and frequency dependent communication elements employed may depend on the amount of data to transmit and the number of RF channels that may be employed at the same time. For example, there may be some wireless devices that may only work on a single RF channel where employing multiple RF channels in parallel is not an option.

As discussed above, the data communication element matrix 200 represents a spectrum of five RF channels and 10 time periods. Of course, the data communication element matrix 200 merely represents a simple matrix within a wireless medium for illustrative purposes. In one embodiment, a data communication element matrix of a wireless medium may have a frequency dimension of 4 GHz and a time dimension selected to match a cycle time required to support a streaming video or audio, e.g. 10 msec. Assuming a modulation efficiency of 0.5 b/Hz and a factor two loss in guard time, the overall capacity of the data communication element matrix will be about 1 Gigabit in the composite coverage area of a plurality of wireless devices. If the time period of the data communication element matrix is set to 0.5 msec, and the RF channel is 200 MHz wide, the raw capacity per time and frequency dependent communication element is about 25 Kb/s. To send a 2.5 Mbyte file, for example, the first and second wireless devices may allocate 20 time and frequency dependent communication elements in 40 consecutive data communication element matrices resulting in a transmission time of about 0.4 seconds. Alternatively, one time and frequency dependent communication element in 800 consecutive data communication element matrixes may be employed, resulting in a transmission time of about 8 seconds.

Referring now to FIG. 3, illustrated is a block diagram of an embodiment of a media access controller, generally designated 300, constructed in accordance with the principles of the present invention. The media access controller 300 includes a contention controller 310 and a data transmitter 320.

The media access controller 300 may be a dedicated device that is constructed of special-purpose hardware employing a sequence of operating instructions, which directs its operation. In some embodiments, the media access controller 300 may be employed in a device that is solely hardwired or that is solely software enabled using general purpose hardware.

In the illustrated embodiment, the media access controller 300 is employed within a conventional microprocessor. The contention controller 310 and the data transmitter 320 may be employed within the same conventional microprocessor or in separate microprocessors that communicate. For example, the contention controller may be employed within the control logic of an associated transmitter.

Similar to a conventional media access controller, the media access controller 300 corresponds to a Layer 2 Data Link (Layer 2 of the Open Systems Interconnect architecture) and may provide error detection, medium sharing, packet formats and packet addressing. Typically, the media access controller 300 may be coupled to a conventional physical layer (Layer 1 of the Open Systems Interconnect architecture). In a wireless environment such as a radio implementation, the physical layer corresponds to a radio front end and baseband signal processing sections. In the illustrated embodiment, the media access controller 300 is coupled to a radio frequency antenna within a wireless transmitter or receiver and employed to control media access for data communication. The media access controller 300 in the transmitter may identify time and frequency dependent data communication elements that may be employed for data communication. The media access controller 300 may also interact with a medium access controller of the receiver to determine the available time and frequency dependent data communication elements. The media access controller 300, of course, may also establish and direct data communication with other wireless device. In one embodiment, the media access controller 300 may employ a medium having a bandwidth of at least 50 Mbits per second. In some embodiments, the data communication may be half-duplex or simplex.

The contention controller 310 may divide the available spectrum of the wireless medium into RF channels and time slots to define a matrix. In addition, the contention controller 310 may allocate the elements of the matrix in an as needed fashion. In the illustrated embodiment, the contention controller 310 allocates the communication elements by trial and error. For example, the contention controller 310 in the transmitter, or first wireless device, employs a control channel that is defined in the wireless medium to identify mutually available ones of a plurality of time and frequency dependent data communication elements which are also defined in the medium. The contention controller 310 sends out a "message" on the control channel to a second wireless device which is identified by an address, identifying which time and frequency dependent data communication elements are needed for data communication. For example, the contention controller 310 may identify 50% of the time and frequency dependent data communication elements as represented in Row 5 of the data communication element matrix 200 in FIG. 2. If the receiver, or second wireless device, recognizes the message and determines that the identified time and frequency dependent data communication elements are available, then the second wireless device signals the first wireless device on the control channel indicating to the contention controller 310 that the identified time and frequency dependent data communication elements are available. If the identified time and frequency dependent data communication elements are not available to the second wireless device, then the second wireless device responds through the control channel to the first wireless device identifying other time and frequency dependent data communication elements that may be used for data communication. The first and second wireless devices, more specifically the contention controller 310 of the media access controller 300 within each device, may therefore use trial and error adaptively to identify available time and frequency dependent data communication elements.

Other wireless devices within the area of the first and second wireless devices may also receive the messages on the control channel indicating which time and frequency dependent data communication elements may be used for data communication. The other wireless devices are then advantageously precluded from using these identified and available elements. The allocation of the time and frequency dependent data communication elements, therefore, may occur using trial and error with the results broadcast via the control channel to the other wireless devices in the area. The response of the other wireless devices may also be broadcast therebetween.

In one embodiment, the contention controller 310 broadcasts a time base signal over the control channel to align the first and second wireless devices temporally. The contention controller 310 may also broadcast occasional transmissions from the first and second wireless devices regarding free and in-use data communication elements. In addition, the contention controller 310 may determine a number of data communication elements to employ for said data communication based on a desired data transmission rate.

The data transmitter 320, coupled to the contention controller 310, enables data communication by employing the mutually available ones of the time and frequency dependent data communication elements as determined by the contention controller 310. The data transmitter 320 may perform as a conventional medium access controller regarding the physical transfer of data. Unlike a conventional medium access controller, however, the data transmitter 320 enables data communication based on the control of the contention controller 310. The data transmitter 320 may employ the mutually available ones of the time and frequency dependent data communication elements as long as necessary to complete the data communication. The data, therefore, may not be required to be packetized.

Referring now to FIG. 4, illustrated is a flow diagram of an embodiment of a method, generally designated 400, of access control for a medium, constructed in accordance with the principles of the present invention. The method 400 starts in a step 405 with an intent to control medium access.

After starting, an employment of a control channel is allowed in a step 410. The control channel may employ a conventional IEEE 802.11 protocol. Alternatively, the control channel may employ a row of a plurality of time and frequency dependent data communication elements that correspond to a single RF channel. Efficiency of the control channel is not a high concern since the control channel is not used for transmitting data.

After employing a control channel, a time base signal is broadcast in a step 420. The time base signal may be broadcast over the control channel to align first and second wireless devices temporally. The time base signal may be one technique by which the devices can resynchronize and thereby discriminate in the temporal dimension. In some embodiments, the temporal alignment of the first and second wireless devices may be performed continuously and independent of the actual data transmission process.

In the illustrated embodiment, the time base signal is broadcast through a time beacon that marks the beginning of a matrix and that defines the time length and the frequency width of its elements. The time beacon may be a timing message over a control channel that initially indicates to receptive wireless devices that it is a time beacon. In addition, the time beacon may include a weight factor that indicates the number of wireless devices within the area. For example, a first wireless device that does not receive a time beacon signal may transmit a time beacon with a weight of 0. The first wireless device may send the time beacon with the weight of 0 every 20 matrix periods. Each of the wireless devices may adjust its own timing to the time beacon with the lowest weight factor. Typically, the wireless devices will ignore a time beacon with a weight factor that is higher than the weight factor of a previously received time beacon. The wireless devices, such as a second wireless device, may re-transmit the time beacon it is aligned with at the beginning of the next matrix. Before re-transmitting, the second wireless device increases the weight factor by one. Every 20th time beacon that is sent may be followed by a matrix occupation image which indicates which time and frequency dependent data communication elements of the matrix are seen to be occupied. The wireless devices may determine the occupied elements by sensing the energy in the RF channels being used.

Following the broadcasting of a time base signal, data communication elements are identified in a step 430. The data communication elements may be identified by a medium access controller of a first wireless device, or transmitter, as discussed above with respect to FIG. 3. A medium access controller may identify the data communication elements based on various allocations such as 10%, 20% or 50%. The medium access controller of the first wireless device may determine the number of data communication elements to employ for the data communication based on a desired data transmission rate. In the illustrated embodiment, the data communication elements are time and frequency dependent data communication elements of a data communication matrix defined within the medium. In one embodiment, the medium may have a bandwidth of at least 50 Mbits per second.

After identifying the data communication elements, a determination is made if the data communication elements are available in a decisional step 440. In a preferred embodiment, a second wireless device, or a receiver, may receive through the control channel which ones of the data communication elements were identified by the first wireless device. The second wireless device may examine the identified data communication elements and determine if the identified communication elements are available for data communication.

If it is determined that the data communication elements are available, then the mutually available data communication elements are confirmed in a step 450. In the preferred embodiment, the second wireless device may respond to the first wireless device over the control channel that the identified communication elements are available for data communication. In some embodiments, the wireless devices may also transmit via the control channel occasional transmissions regarding free and in-use wireless devices or data communication elements.

After confirming the mutually available communication elements, access to the mutually available communication elements is granted in a step 460. In the preferred embodiment, the first wireless device may grant access to the mutually available data communication elements upon receiving confirmation over the control channel from the second wireless device. The mutually available data communication elements may then be employed for data communication between the first and second wireless device. In one embodiment the data communication may be half-duplex. In other embodiments, the data communication may be simplex. Finally, the access control method for a medium ends in a step 470.

Returning now to the decisional step 440, if the identified data communication elements are not available, then the identified data communication elements may be adjusted in a step 480. The data communication elements may be adjusted over several cycles of interaction between the first and second wireless device. The data communication elements, therefore, may be adaptively allocated.

Although the present invention has been described in detail, those skilled in the art should understand that they can make various changes, substitutions and alterations herein without departing from the spirit and scope of the invention in its broadest form.

What is claimed is:

1. An access control method for a medium, comprising:
   allowing first and second devices to employ a control channel defined in said medium to identify mutually available ones of a plurality of time and frequency dependent data communication elements defined in said medium; and
   thereafter granting said first and second devices access to said mutually available ones to enable data communication therebetween.

2. The method as recited in claim 1 wherein said medium has a bandwidth of at least 50 Mbits per second.

3. The method as recited in claim 1 wherein said data communication is half-duplex.

4. The method as recited in claim 1 further comprising broadcasting a time base signal over said control channel to align said first and second devices temporally.

5. The method as recited in claim 1 further comprising receiving occasional transmissions from said first and second devices regarding free and in-use data communication elements.

6. The method as recited in claim 1 wherein said identify is performed adaptively.

7. The method as recited in claim 1 wherein said first device determines a number of data communication elements to employ for said data communication based on a desired data transmission rate.

8. A media access controller, comprising:
   a contention controller that employs a control channel defined in said medium to identify mutually available ones of a plurality of time and frequency dependent data communication elements defined in said medium; and
   a data transmitter that thereafter employs said mutually available ones to enable data communication therebetween.

9. The controller as recited in claim 8 wherein said medium has a bandwidth of at least 50 Mbits per second.

10. The controller as recited in claim 8 wherein said data communication is half-duplex.

11. The controller as recited in claim 8 wherein said contention controller broadcasts a time base signal over said control channel to align said first and second devices temporally.

12. The controller as recited in claim 8 wherein said contention controller receives occasional transmissions from said first and second devices regarding free and in-use data communication elements.

13. The controller as recited in claim 8 wherein said identify is performed adaptively.

14. The controller as recited in claim 8 wherein said contention controller determines a number of data communication elements to employ for said data communication based on a desired data transmission rate.

15. A wireless communication system, comprising:
- a plurality of wireless devices including first and second wireless devices;
- a wireless medium interconnecting said plurality of wireless devices;
- a control channel defined in said wireless medium; and
- a plurality of time and frequency dependent data communication elements defined in said wireless medium, said first and second wireless devices employing said control channel to identify mutually available ones of said plurality of time and frequency dependent data communication elements, access to said mutually available ones being thereafter granted to said first and second wireless devices to enable data communication therebetween.

16. The system as recited in claim 15 wherein said wireless medium has a bandwidth of at least 50 Mbits per second.

17. The system as recited in claim 15 wherein said data communication is half-duplex.

18. The system as recited in claim 15 wherein a time base signal is broadcast over said control channel to align said first and second wireless devices temporally.

19. The system as recited in claim 15 wherein said first and second wireless devices generate occasional transmissions regarding free and in-use data communication elements.

20. The system as recited in claim 15 wherein said identify is performed adaptively.

21. The system as recited in claim 15 wherein said first device determines a number of data communication elements to employ for said data communication based on a desired data transmission rate.

* * * * *